F. PHILP, G. KEMP & W. H. GIBBONS
ELECTRIC HEATER.
APPLICATION FILED NOV. 1, 1912.
1,082,168.
Patented Dec. 23, 1913.
Fig. 1.
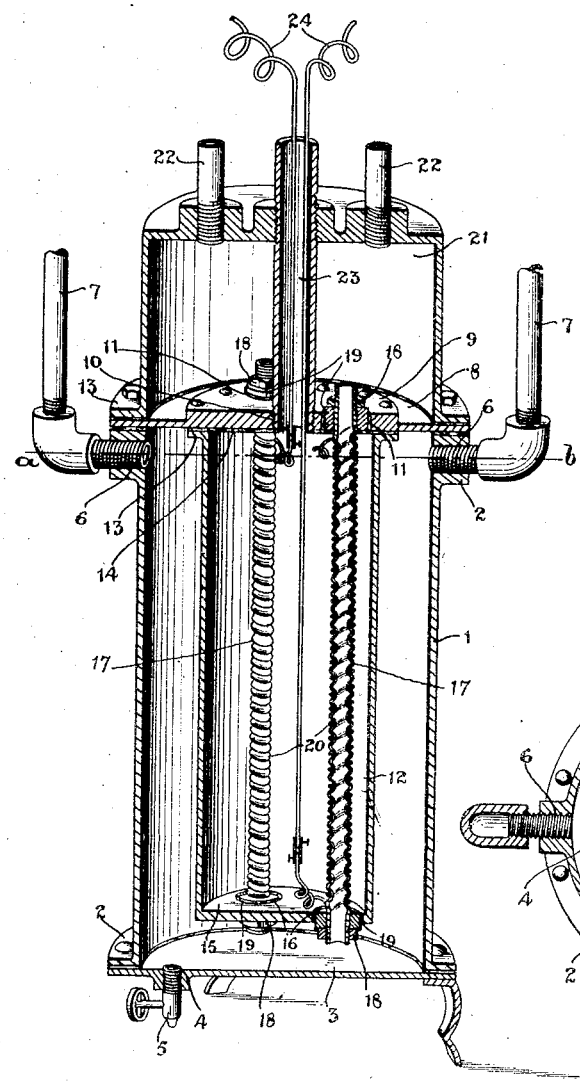
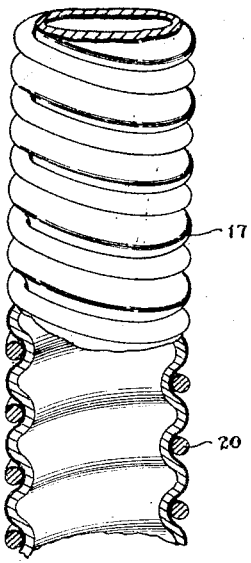
Fig. 3.
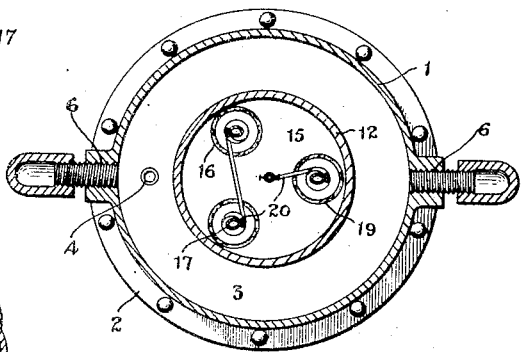
Fig. 2.
Witnesses.
H. L. Grimble.
E. Heron.
Inventors.
Frank Philp.
George Kemp.
by W. H. Gibbons.
H. J. S. Dennison.
Atty.

UNITED STATES PATENT OFFICE.

FRANK PHILP AND GEORGE KEMP, OF PORT ARTHUR, AND WILLIE H. GIBBONS, OF LONDON, ONTARIO, CANADA.

ELECTRIC HEATER.

1,082,168.  Specification of Letters Patent.  Patented Dec. 23, 1913.

Application filed November 1, 1912. Serial No. 729,053.

*To all whom it may concern:*

Be it known that we, FRANK PHILP and GEORGE KEMP, both subjects of the King of Great Britain, and residents of Port Arthur, in the District of Thunder Bay, Province of Ontario, in the Dominion of Canada, and WILLIE H. GIBBONS, subject of the King of Great Britain, and resident of London, county of Middlesex, Province of Ontario, in the Dominion of Canada, respectively, have invented certain new and useful Improvements in Electric Heaters, described in the following specification and illustrated in the accompanying drawings, that form part of the same.

The invention consists essentially in the novel construction and arrangement of parts whereby the water, air or other fluid to be heated is circulated through a secondary heating chamber in its passage to the primary heating element.

The object of the invention is, to devise an efficient and economical form of electric heater of simple and durable construction which may be adapted for steam, water or air heating and which will not be liable to get out of order.

In the drawings, Figure 1 is a vertical sectional perspective view of a heater constructed in accordance with this invention. Fig. 2 is a cross sectional view through the line $a$—$b$ Fig. 1. Fig. 3 is an enlarged perspective view of a portion of one of the primary heating elements shown partly in longitudinal section.

Like numerals of reference indicate corresponding parts in each figure.

Referring to the drawings, 1 is a casing here shown of cylindrical form and having the lateral flanges 2 at the bottom and top thereof.

3 is a plate closing the bottom end of the casing 1 and secured by suitable rivets or bolts to the bottom flange 2, said plate having an opening 4 therein in which a suitable drain cock 5 is secured.

6 are openings in the side wall of the casing 1 adjacent to the top in which the intake pipes 7 are inserted. Two of these pipes are shown but one or more may be used as desired.

8 is a head secured to the upper flange of the casing and preferably formed with a heavy circular central portion 9, said central portion having a central threaded hole 10 therein and a plurality of circular orifices 11.

12 is a cylindrical casing of smaller diameter than the casing 1 having a flange 13 at the upper end secured to the underside of the head 8 and arranged centrally thereof, a suitable gasket 14 being inserted between said flange and head. The bottom closed end 15 of the cylinder 12 is arranged a short distance above the plate 3 and is provided with a plurality of circular orifices 16 arranged in vertical alinement with the orifices 11 in said head.

17 are tubular members extending through the casing 12 and having their open ends projecting through the orifices 11 and 16 and held in place by the nuts 18 threaded on the extremities.

19 are bushings of cork or other suitable material arranged in the orifices 11 and 16 and surrounding the tubes 17 forming water tight packings which will allow free expansion and contraction of the said tubes. The tubes 17 are formed with a rolled spiral thread terminating within the casing 12 and the exterior surface is covered with a suitable insulating enamel coating.

20 are wires of high resistance metal wound around the exterior of the tubes 17, said wires lying in the spiral grooves are held firmly in contact with said tubes and cannot be shifted or be displaced. The wires 20 in conjunction with the spiral tubes present a maximum heating surface, the heat radiating to the interior of the casing 12 and also in the interior of said tubes.

21 is a cylindrical cap secured to the head 8 and forming an upper chamber which communicates with the open ended tubes 17 and forms a storage or collecting chamber for the heated fluid passing upwardly through the tubes.

22 are discharge pipes leading from the top of the cap 21.

23 is a tube secured in the central threaded hole 10 in the head 8 and extending upwardly through the top of the cap 21, said tube forming a conduit for the electric leads 24 connected to the heating elements.

In the operation of this device the electric current flows through the leads 24 and high resistance wires surrounding the spiral tubes thus creating a very great heat in a comparatively small space. The water, air or other fluid to be heated enters the annular chamber formed between the casings 1 and 12 and the temperature is raised by contact with the exterior surface of the chamber 12. A very high temperature is created within the tubes 17 and the initially heated fluid flows upwardly through said tubes and is thus further heated. The heated fluid then collects in the chamber formed in the cap 21 and circulates up through the discharge pipes 22 through which it is carried to the desired apparatus, the return being through the pipes 7.

The device may be used as a water heater or steam generator as desired or it may be adapted for heating air and in either case the efficiency is very high. The device is of comparatively small cubic capacity but as very high temperatures can be obtained its efficiency is effected by rapid circulation. The many advantages of such an apparatus are obvious as very quick results may be obtained and all the labor and many undesirable features of the ordinary forms of coal and gas heaters are eliminated. Further, great economy of space is effected.

What we claim as our invention is:—

1. In an electric heater, a closed casing having suitable intake openings, a closed casing suspended within said outer casing, tubular members arranged in said inner casing and extending therethrough and having open ends and communicating with the space between said inner and outer casings, and high resistance wires coiled around said tubes and electrically connected to a suitable electric current supply and forming with said tubes the primary heating element.

2. In an electric heater, a closed casing having suitable intake openings, a closed casing suspended within said outer casing, tubular members arranged in said inner casing and extending therethrough and having open ends and communicating with the space between said inner and outer casings, said tubes having their peripheral surface formed with a spiral thread rolled therein, a suitable insulating coating covering the periphery of said tubes, and high resistance wires wound in said spiral grooves and connected to a suitable electric current supply, said wires with said tubes forming a primary heating element.

3. In an electric heater, a cylindrical casing, a partition wall extending across said cylindrical casing intermediate of its height and dividing the interior of said cylinder into upper and lower chambers, a closed casing suspended within said lower chamber centrally thereof and having a tubular extension projecting upwardly through said upper chamber and opening through the top of said casing, a plurality of tubular members open at the ends extending through said closed casing and secured at the ends in water tight joints, high resistance electric wires wound spirally around said tubes within said inner closed casing and connected to suitable leads from an electric current supply extending through said central tubular extension, intake pipes connected to said cylinder and opening into said lower chamber at the top thereof, and discharge pipes leading from said upper chamber.

4. In an electric heater, a casing closed at the ends and having a partition wall dividing it into upper and lower chambers, said partition wall having a plurality of circular openings therethrough, an inner closed casing suspended from said partition wall within the lower chamber and having a plurality of openings in the lower end corresponding with the openings in said partition wall, bushings of flexible material secured in said openings, tubular members open at the ends and extending through said bushings and through said inner casing and having nuts threaded at their extremity securing them in place, electric high resistance wires coiled spirally around said tubes and connected to a suitable source of electric current supply, intake pipes leading to said lower chamber, and outlet pipes leading from said upper chamber.

Signed at Port Arthur, this second day of May.

FRANK PHILP.
GEORGE KEMP.

Witnesses:
ALFRED STILL,
PETER BARR.

Signed at the city of Toronto, Canada, this 30th day of October, 1912.

WILLIE H. GIBBONS.

Witnesses:
E. HERON,
H. L. TRIMBLE.